United States Patent [19]

Sugimori et al.

[11] Patent Number: 4,742,472
[45] Date of Patent: May 3, 1988

[54] METHOD AND APPARATUS FOR CONTROLLING POLYMERIZATION REACTION

[75] Inventors: Teruhiko Sugimori; Fumio Suzuki; Naoyuki Fukahori, all of Hiroshima, Japan

[73] Assignee: Mitsubishi Rayon Co., Ltd., Tokyo, Japan

[21] Appl. No.: 725,813

[22] Filed: Apr. 22, 1985

[30] Foreign Application Priority Data

May 24, 1984 [JP] Japan ................................ 59-103663

[51] Int. Cl.$^4$ .............................................. G05D 7/00
[52] U.S. Cl. .................................... 364/500; 376/217; 376/210; 422/138
[58] Field of Search ............... 364/500, 473, 509, 510; 376/216, 217, 174, 210, 211, 240, 243, 244, 247; 422/131, 132, 138

[56] References Cited

U.S. PATENT DOCUMENTS

| 3,926,738 | 12/1975 | Nyiri et al. | 435/290 |
|---|---|---|---|
| 3,931,503 | 1/1976 | Berkebile et al. | 376/210 |
| 3,991,258 | 9/1976 | Beckingham et al. | 526/59 |
| 4,061,848 | 12/1977 | Sistig et al. | 422/138 |
| 4,488,239 | 12/1984 | Agarwal | 364/500 |
| 4,491,924 | 1/1985 | Agarwal | 364/500 |

FOREIGN PATENT DOCUMENTS

| 648358 | 9/1962 | Canada | 376/211 |
|---|---|---|---|
| 0071988 | 5/1982 | European Pat. Off. | 364/500 |
| 0111341 | 6/1984 | European Pat. Off. . | |
| 0124333 | 11/1984 | European Pat. Off. . | |
| 3117564 | 10/1982 | Fed. Rep. of Germany . | |

Primary Examiner—Errol A. Krass
Assistant Examiner—Brian M. Mattson
Attorney, Agent, or Firm—Cushman, Darby & Cushman

[57] ABSTRACT

This invention provides a method and an apparatus for controlling a polymerization reaction. The temperature difference between a target temperature, calculated from the degradation rate of a polymerization initiator, which varies as a function of temperature, and a polymerization reactor temperature is calculated. The difference in polymerization rate between a target polymerization rate previously set and a polymerization rate calculated from a measured heat release value at a certain time in the polymerization process is calculated. The temperature inside the reactor is finely adjusted on the basis of the temperature difference and the difference in polymerization rate.

3 Claims, 5 Drawing Sheets

METHOD AND APPARATUS FOR CONTROLLING POLYMERIZATION REACTION

BACKGROUND OF THE INVENTION

The present invention relates in general to a method and an apparatus for controlling a polymerization reaction, and particularly to those in which an optimum polymerization reaction is attained by temperature control.

When organic polymers are produced by a suspension polymerization, an emulsion polymerization or the like, the particle sizes of polymers formed with a lapse of time must in general be as uniform as possible. This is because the physical and chemical properties of organic polymers produced under the conditions of polymerization in which the distribution of the particle sizes is wide are considerably inferior to those of organic polymers produced under the conditions in which said distribution is narrow.

When rubber is produced by emulsion polymerization, for instance, the particle sizes are determined primarily dependent on the fluctuations in the quantity of an emulsifying agent and the temperature of polymerization. Even when the quantity of the emulsifying agent is fixed, therefore, the particle sizes of the produced polymers are varied by the fluctuation of the temperature during the process of polymerization, which results in the deterioration of the quality of the rubber.

Conventional temperature controls are carried out manually on the basis of the data of experiments which were previously performed. This often necessitates complicated valve operations and the like. Even with complicated valve controls, temperature control is not fine enough to achieve the desired result.

There is another proposal for temperature control in which temperature is adjusted on the basis of the rate of polymerization which is known by measuring the density of the solids content of a polymer liquid. According to this proposal, however, temperature control cannot be performed promptly and it is difficult to automate the control of the polymerization reaction. A sample is manually taken from a reactor for measuring the rate of polymerization. Then, temperature is adjusted after the sample is analyzed and the rate of polymerization is determined. In addition, this proposal cannot ensure fine control of temperature, which in turn causes non-uniformity of particle size and the consequent deterioration of polymer quality.

Furthermore, for the purpose of reducing the time required for measuring the rate of polymerization, a method has been proposed in which the rate of polymerization is measured from the refractive index of an emulsion in the reactor (ref. the Official Gazette on Japanese Patent Laid-Open No. 58-206602). According to this proposal, it is necessary also to take out the emulsion from the reactor, which would put restrictions on the installations especially when the emulsion is unstable.

SUMMARY OF THE INVENTION

An object of the present invention is to provide a method for controlling a polymerization reaction to prepare polymers of uniform particle size, and an apparatus for controlling the polymerization reaction which facilitates and ensures the control of particle sizes.

The method and apparatus for controlling the polymerization reaction provided by the present invention features various sensors for determining status of the polymerization reaction, computerized analysis of status and fine temperature control so as to achieve uniform particle size.

More particularly, the present invention provides a method for controlling a polymerization reaction comprising the steps of:

calculating the temperature difference between a target temperature calculated from the degradation rate of a polymerization initiator depending on the temperature and a temperature detected in a reactor over a short time interval;

calculating the difference in polymerization rate between a target polymerization rate previously set and a polymerization rate calculated from a heat release value of polymerization which is measured over a short time interval; and adjusting the temperature inside said polymerization reactor over a short time interval based on said temperature difference and said difference in polymerization rate.

Moreover, the present invention provides an apparatus for controlling the polymerization reaction comprising:

temperature-detecting means for detecting the temperature inside the reactor;

measuring means for measuring the heat release value of polymerization in the reactor;

memory means for storing the target polymerization rate and the degradation rate of a polymerization initiator as a function of the temperature;

arithmetic means for calculating a correction value from said detected temperature, the heat release value of polymerization, the target polymerization rate and the degradation rate which are input thereto over a short time interval; and adjusting means for adjusting the temperature inside the reactor over a short time interval based on said correction value.

The above and other related objects and features of the invention will be apparent from a reading of the following description of the invention in conjunction with the accompanying drawings.

DETAILED DESCRIPTION OF THE PREFERRED EMBODIMENT

The following is a detailed description of the presently preferred embodiment of the present invention with reference to the drawings.

Figure 1:
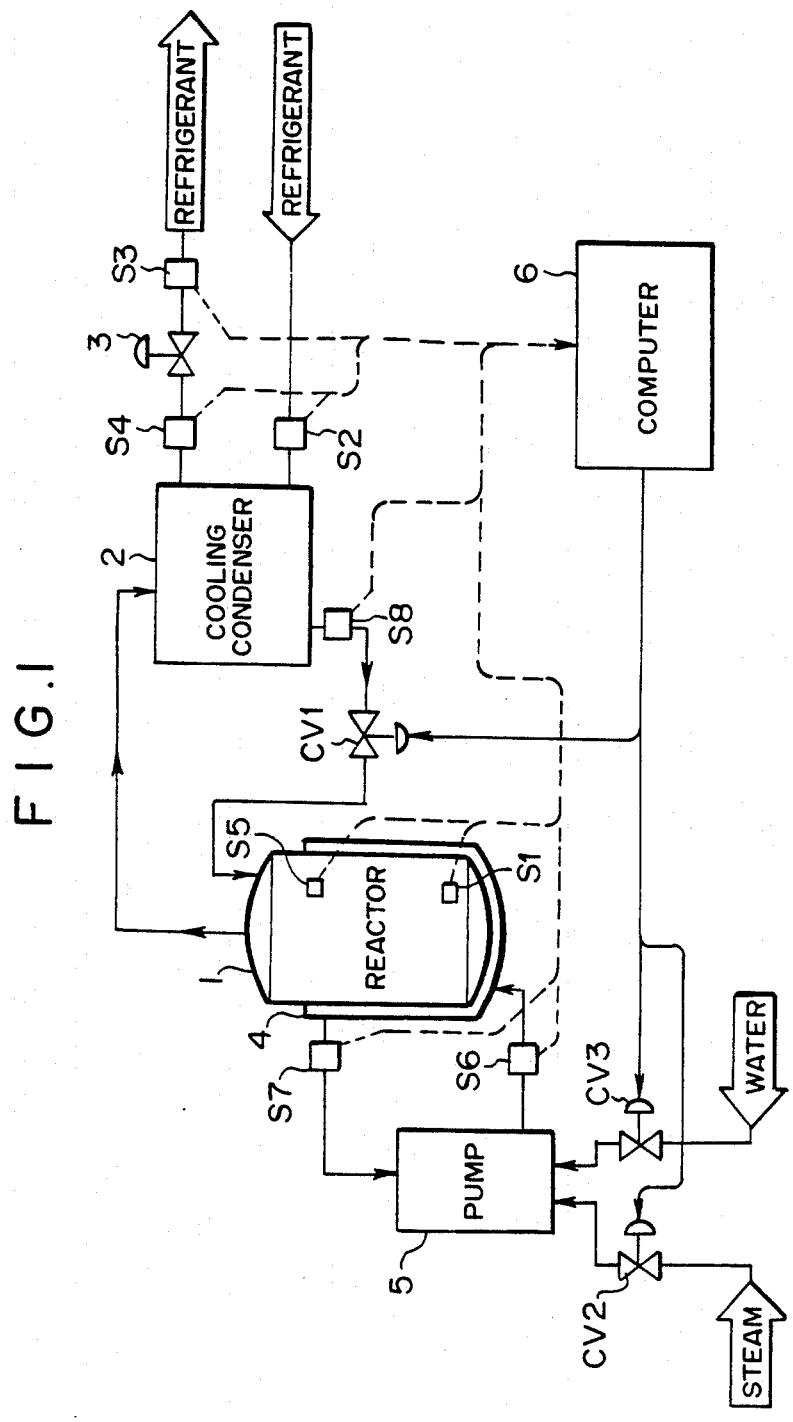
FIG. 1 shows the construction of one embodiment of an apparatus for controlling the polymerization reaction according to the present invention.

FIG. 1 shows the construction of one embodiment of the apparatus for controlling the polymerization reaction according to the present invention.

In this figure, a cooling condenser 2 used as a cooling means is connected to a reactor 1. In the present embodiment, monomer(s) (e.g. butadiene) condensed by the cooling condenser 2 are supplied into the reactor 1 via a control valve CV1, and cooling occurs by the latent heat of vaporization of the monomers. The gases of the vaporized monomers are condensed again by the cooling condenser 2, and the above-described process is repeated.

In order to cool down the gases of the vaporized monomers, a refrigerant is supplied to the cooling condenser 2, and the flow rate thereof is controlled by a control valve 3.

Reactor 1 is provided with a jacket 4 which provides cooling and heating. Hot water in jacket 4 is forced to circulate by a pump 5, and the temperature of the hot water is controlled by a control valve CV2 supplying steam to a tank in the pump 5 and by a control valve CV3 supplying water thereto.

Reactor 1 and the cooling system therefor thus constructed are provided with a temperature sensor S1 (e.g. a platinum temperature-measuring resistor, a thermocouple or the like) which detects a temperature $T_R$ inside the reactor 1, a temperature sensor S2 which detects the inlet temperature $T_{Bi}$ of the refrigerant supplied to cooling condenser 2, a temperature sensor S3 which detects the outlet temperature $T_{Bo}$ of the refrigerant, a flow sensor S4 (e.g. an ultrasonic flowmeter, an orifice-type flowmeter or the like) which detects the flow rate $F_B$ of the refrigerant, a pressure sensor S5 which detects a pressure $P_R$ inside the reactor 1, a temperature sensor S6 which detects the inlet temperature $T_{ji}$ of the hot water supplied to the jacket 4, a temperature sensor S7 which detects the outlet temperature $T_{jo}$ of the hot water, and a level sensor S8 (e.g. a differential pressure type level gauge or the like) which detects a level $H_P$ in the cooling condenser 2, and each of these sensors is set at a position shown in the figure. Detection signals output from these sensors S1 to S8 are input to a computer 6, which controls the control valves CV1 to CV3 based on the detection signals so that the polymerization reaction in the reactor 1 can occur in the optimum manner. The control on the temperature inside the reactor 1 is performed in this way.

Figure 2:
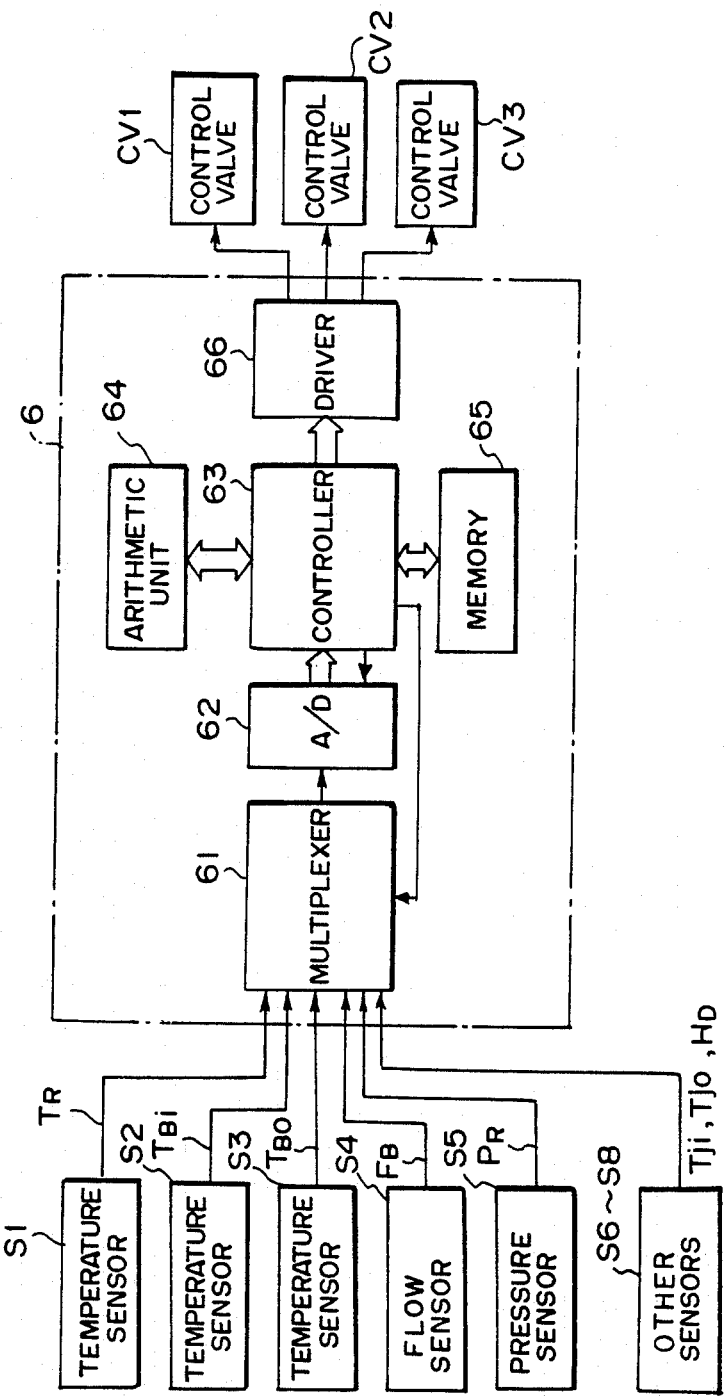
FIG. 2 is a block diagram of the control system of the invention.

FIG. 2 is a block diagram showing the details of the control system of the invention.

In this figure, the respective output terminals of the sensors S1 to S8 described above are connected to the input terminals of a multiplexer 61 in computer 6, and the output terminal of the multiplexer 61 is connected to a controller 63 via an A/D converter 62.

Controller 63 is connected to an arithmetic unit 64 and a memory 65. In the memory 65, a target polymerization rate Y and the degradation rate K of a polymerization initiator depending on the temperature, and other data such as a prescribed count value $t_1$, a prescribed pressure P and a prescribed number a, are stored beforehand.

Furthermore, the controller 63 is connected to the input terminal of a driver 66, and the output terminals of the driver 66 are connected to the control valves CV1 to CV3, respectively.

The controller 63 also delivers control signals to the multiplexer 61, the A/D converter 62 and the driver 66, etc. so as to control the input and output operations thereof. In addition, the controller 63 is provided with a counter (not shown in the figure) for controlling the operations.

Next, a description will be made on the operation of the apparatus constructed as described above with reference to FIGS. 3 and 4. In this description, the emulsion polymerization will be taken up as an example.

Figure 3A:
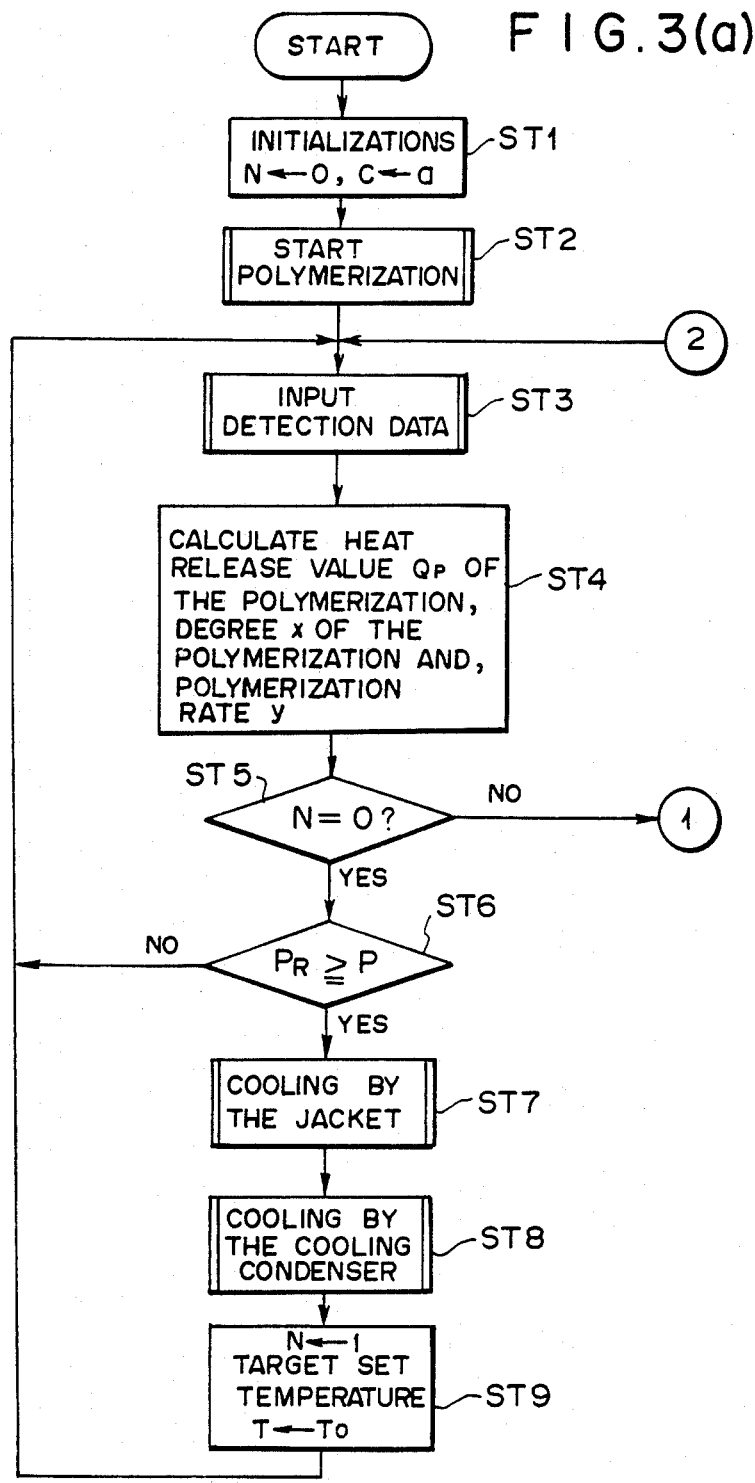
FIGS. 3(a) and (b) are flow charts explaining the operations of the invention.
Figure 4:
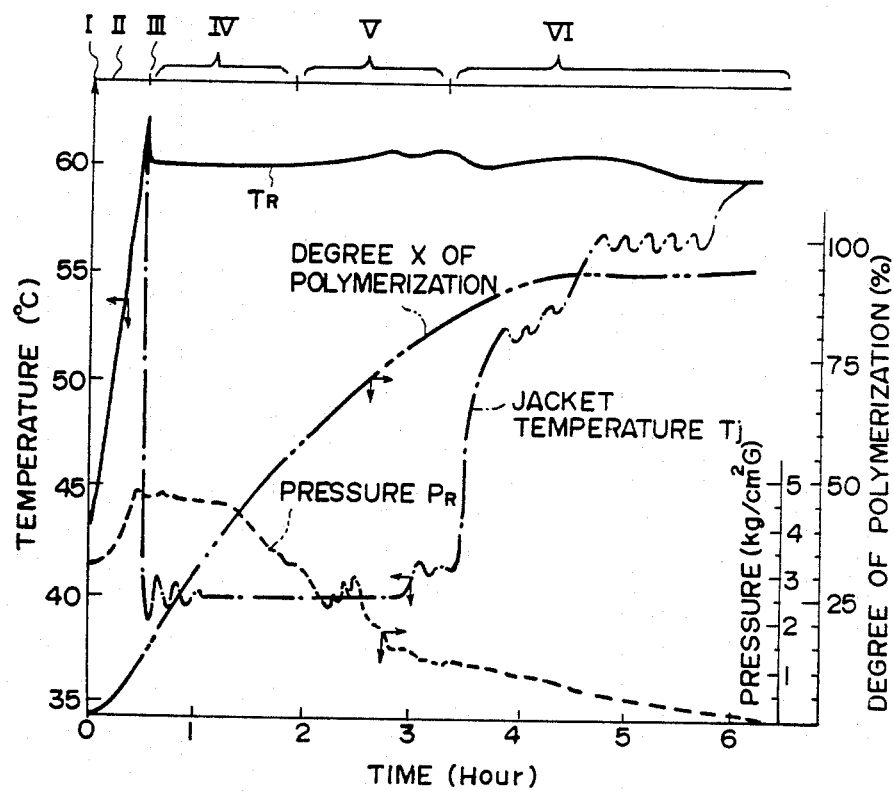
FIG. 4 is a graph showing the change with time of an output of each sensor.

FIGS. 3(a) and (b) are flow charts of the present embodiment, and FIG. 4 is a graph showing the change with time of an output of each of the sensors S1 to S8.

First, when power is applied, the entire apparatus is initialized (ST1). In this step, N is provided to distinguish between a period running from a polymerization start time point I (FIG. 4) to a starting time point of cooling III (FIG. 4) and a period thereafter. C is provided for checking periodically a polymerization rate on and after the starting time point of cooling III.

Subsequently, the computer 6 controls the control valves CV2 and CV3 to supply hot water to the jacket 4 and raise the temperature $T_R$ inside the reactor 1. At the time point I (see FIG. 4) when the temperature $T_R$ detected by the temperature sensor S1 reaches a prescribed temperature, a catalyst is charged in the reactor 1 and thereby the polymerization is started (ST2).

At a time II after the charging of the catalyst is ended, any inert gas in the reactor 1 and the cooling condenser 2 are discharged therefrom, and butadiene monomer (hereinafter denoted by BD) is condensed in the cooling condenser 2.

Subsequent detection data from each of the sensors S1 to S8 are inputted into AID converter 62 sequentially by the operation of the multiplexer 61, converted into a digital signal by the A/D converter 62 and stored in memory 65 (ST3).

Then, the heat release value $Q_P$ of the polymerization, the conversion x and the polymerization rate y are calculated on the basis of the sensor-detected data ($T_R$, $T_{Bi}$, $T_{Bo}$, $F_B$, $P_R$, $T_{ji}$, $T_{jo}$ and $H_D$) which are input (ST4).

The heat release value $Q_p$ of the polymerization is calculated in the following way.

The total value of heat eliminated in the cooling condenser 2: $Q_1$ $$Q_1 = \int_0^t F_B \cdot C_B (T_{Bo} - T_{Bi}) dt$$

where $C_B$ is the heat capacity of the refrigerant.

The total value of heat taken away from the jacket 4: $Q_2$ $$Q_2 = \int_0^t A_J \cdot U_J (T_R - T_J) dt$$

where $A_J$ is the heat transfer area of the jacket 4, $U_J$ the heat transfer coefficient thereof, and $T_J$ an average temperature of the hot water in the jacket calculated from $T_{Ji}$ and $T_{Jo}$.

The value of the increased sensible heat of a content of the reactor 1: $Q_3$ $$Q_3 = V_R \cdot C_R (T_R - T_{Ro})$$

where $V_R$ is the mass of the content of the reactor 1, $C_R$ the specific heat of the content, and $T_{Ro}$ the starting temperature of the polymerization.

The heat release value of the polymerization is calculated from the above heat values by an equation $Q_P = Q_1 + Q_2 + Q_3$.

The conversion x is calculated by an equation $x=Q_P/Q_R$, where $Q_R$ is the theoretical heat release value of the charged monomers. Accordingly, the polymerization rate y is calculated by the following equation:

$$y = \frac{dx}{dt} = \frac{1}{Q_R} \frac{dQ_P}{dt}$$

The data ($Q_p$, x, y) obtained by the above calculations are stored in the memory 65, together with a count value t representing the time point when said data are obtained and a target polymerization rate Y at that time, accompanying the detection data described above.

Next, whether or not N=0 is determined (ST5). Since N=0 in the present case (YES in ST5), whether or not the pressure $P_R$ inside the reactor 1 exceeds the prescribed pressure P is determined subsequently (ST6).

If the pressure inside the reactor 1 has not reached the prescribed pressure P (NO in ST6), sensor-defected data at the subsequent time point are input (ST3), and thus the above steps ST3 to ST6 are repeated until the pressure $P_R$ inside the reactor 1, i.e. the detection data from the pressure sensor S5, reaches the prescribed pressure P.

When the pressure $P_R$ inside the reactor 1 reaches the prescribed pressure P (YES in ST6), the controller 63 controls the control valves CV2 and CV3 through the driver 66 so as to lower rapidly the temperature of the hot water in the jacket 4 (ST7). Simultaneously, the control valve CV1 is opened under the condition that the cooling power of the cooling condenser 2 is fully increased to drop the accumulated BD into the reactor 1 and to start the cooling by the latent heat of vaporization (ST8). This time point corresponds to the cooling start time point III in FIG. 4.

When the cooling by the cooling condenser 2 is started (ST8), numeral 1 is stored in N, while an initial value $T_0$ is stored in a target set temperature T (ST9). Then, after the operations in ST3 and ST4 are performed as described previously, determination is made as NO at ST5, since N=1 at this time.

In succession, whether or not the count value t reaches the prescribed $t_1$ is determined (ST10). The prescribed value $t_1$ corresponds to the time point of the termination of a period IV in FIG. 4, and during this period IV, a normal cooling operation is conducted by the cooling condenser 2.

Since the count value t has not yet reached the prescribed value $t_1$ in the present case (NO in ST10), C is incremented by +1 (ST11), and whether or not the value of C thus incremented is smaller than the prescribed value a is determined (ST12).

When C<a (YES in ST12), the opening degree of the control valve CV1 is calculated so that the polymerization conditions may be the optimum (ST13 to ST16).

First, the flow rate $F_D$ of refluxed BD is calculated by an equation $F_D = R_D\sqrt{H_D}$, where $R_D$ is the flow resistance of the control valve CV1 and $H_D$ an amount detected by the sensor S8.

By using the value of the flow rate $F_D$ of the refluxed BD thus calculated and the heat release value $Q_P$ of the polymerization, the heat elimination coefficient E of BD at the present time point is calculated by an equation $E=Q_P/F_D$ (ST13).

Subsequently, a correction heat value $\Delta Q$ is calculated from the temperature difference ($T_R - T$) between the temperature $T_R$ at the present time point in the reactor 1 which is detected by the temperature sensor S1 and the target set temperature T which is the initial value $T_0$ (ST14). On the occasion, the rate of change with time of the temperature inside the reactor 1 is set in accordance with the temperature difference ($T_R - T$) beforehand, and said temperature is made to return to the target set temperature T in the optimum state. When this rate of change with time is set, the state inside the reactor 1 during a period between the time points I and III can be controlled by the temperature.

Based on the correction heat value $\Delta Q$ at the present time point (ST14) and the heat elimination coefficient E of BD (ST13) thus calculated, a correction value $\Delta F_D$ of the flow rate of BD is calculated by the following equation.

$$\Delta F_D = \Delta Q/E$$

Accordingly, the flow resistance $R_D'$ of the control valve CV1 at the present time point is calculated by the following equation (ST15).

$$R_D' = \frac{F_D + \Delta F_D}{\sqrt{H_D}}$$

Then, the value of the flow resistance $R_D'$ is output from the controller 63 to the driver 66, and based on said value, the driver 66 varies the opening degree of the control valve CV1 (ST16).

With the variation in the opening degree of the control valve CV1, the flow rate of BD varies, the eliminated heat value in the reactor 1 is thereby adjusted, and as the result, the temperature $T_R$ inside the reactor 1 becomes closer to the target set temperature T.

Then, sensor-detected data obtained at the following time point are input again (ST3), and the operations at the steps ST4, ST5 and ST10 to ST16 are repeated as described above for performing the temperature control.

When the above operations are repeated, C becomes equal to a at the time point of the a-th repetition (ST12), and determination is made as NO at ST12.

Next, the polymerization rate Y to serve as a target is read out of the memory 65 (ST17), and it is determined whether or not the difference between the calculated polymerization rate y at the present time point (ST4) and the target polymerization rate Y is smaller than a prescribed value $\delta$ (ST18). When said difference is smaller than the prescribed value $\delta$ (YES in ST18), C is set to 0 (ST19) and the above-described normal cooling operations (ST13 to ST16) are performed. When the above difference exceeds the prescribed value $\delta$ (NO in ST17), the target set value T is readjusted by using this difference and the degradation rate K of the initiator depending on the temperature which is stored beforehand in the memory 65 (ST20).

Concretely, first a correction coefficient $\alpha$ of the degradation rate of the initiator, which is required for obtaining a prescribed polymerization rate, is calculated by the following equation.

$$\alpha = k \cdot Y/y$$

where Y is the target polymerization rate, y the present polymerization rate, and k a constant set before hand. Then, a new target set temperature T is calculated by the following equation.

$$T = \frac{1}{\frac{1}{T_R} - \frac{R}{E} \ln \alpha}$$

where E is an activation energy set by an initiator system, R a gas constant, and $T_R$ the present polymerization temperature.

When the target set temperature T is reset (ST20), C is set to 0 (ST19), and the above-described cooling operations (ST13 to ST16) are performed. In other words, the correction value ΔQ is calculated by using the target set temperature T newly set (ST14), and based thereon, the cooling operations are performed.

In this way, a fine temperature control is effected in the period IV (ref. FIG. 4), the temperature inside the reactor 1 is thus maintained at a target value with high accuracy, and consequently the polymerization rate is also maintained at a target value.

When the period IV is terminated and the count value t exceeds the prescribed value $t_1$ (YES in ST10), BD in the cooling condenser 2 is returned into the reactor 1 within a period V (ST21).

When the period V is ended, the controller 63 adjusts the control valves CV2 and CV3 via the driver 66 to raise the temperature of the hot water in the jacket 4 so that the temperature $T_R$ inside the reactor 1 is fixed (ST22).

By adjusting the control valves CV1 to CV3 of the cooling condenser 2 and the jacket 4 in this way so that the temperature $T_R$ inside the reactor 1 is maintained at a target value, optimum polymerization conditions can be realized.

The temperature $T_R$ in the period IV in FIG. 4 is particularly important.

Figure 5:
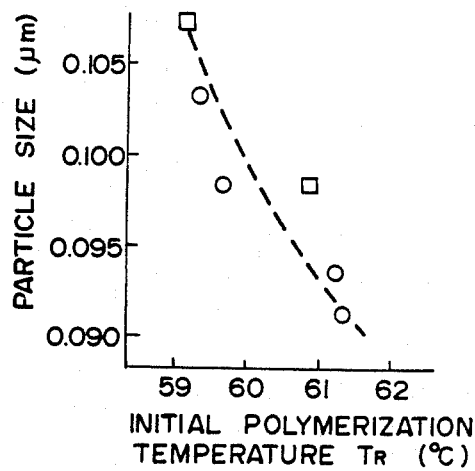
FIG. 5 is a graph showing the temperature dependence of particle sizes.
Figure 6:
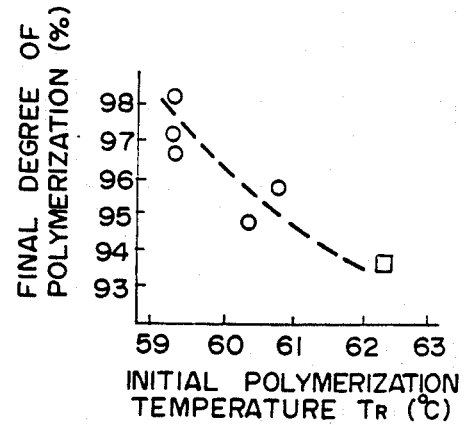
FIG. 6 is a graph showing the temperature dependence of a final conversion.

FIG. 5 is a graph showing the relationship between the initial temperature $T_R$ in the period IV and the particle sizes of the rubber prepared by the emulsion polymerization, and FIG. 6 is a graph showing the relationship between said initial temperature $T_R$ and a final conversion.

As is seen from FIGS. 5 and 6, particle size is small and the final conversion falls when the temperature $T_R$ is high. Therefore, it is necessary to set a target temperature in consideration of the relation with the final conversion and to maintain said temperature with high accuracy, particularly when rubber in small particle sizes is to be prepared.

According to the present embodiment, the temperature $T_R$ inside the reactor 1 was successfully controlled to be within about ±0.1° C. in the period IV and within about ±1.0° C. even in the periods V and VI, as shown in FIG. 4, and as the result, the rubber which had uniform and desired particle sizes was successfully prepared.

In the present embodiment, the starting time point of cooling is decided on the basis of the pressure inside the reactor 1 detected during a period between the time points I and III. The starting time point of cooling can be set also on the basis of the temperature $T_R$, the conversion x, or the polymerization rate y.

In addition, temperature control can be performed on the basis of the difference between the polymerization rate y and the target polymerization rate Y, which is obtained by comparing the former with the latter continuously.

While the operations of the present embodiment are described with respect to emulsion polymerization, it is apparent that the present invention can be applied also to any other polymerization methods.

According to the method and the apparatus for controlling the polymerization reaction proposed by the present invention, as described above in detail, the temperature inside the reactor is stabilized and the particle sizes of polymers are made uniform, since fine temperature control is performed continuously on the basis of the temperature inside the reactor and a target temperature. A desired final conversion can be estimated, and an improvement in yield and the shortening of the polymerization cycle can be attained, since the temperature inside the reactor is stable. The conversion at the present time point can be presumed and the accuracy in a reaction control can be improved, since the conversion and the polymerization rate are calculated from a heat release value of polymerization.

The present control system can be applied easily to the existing reactors as well without providing any additional new detecting means in the reactor or preparing any reservoir of a reaction liquid for presuming the conversion and the polymerization rate.

To aid in understanding the present invention, the following examples are provided.

EXAMPLE 1

Figure 3B:
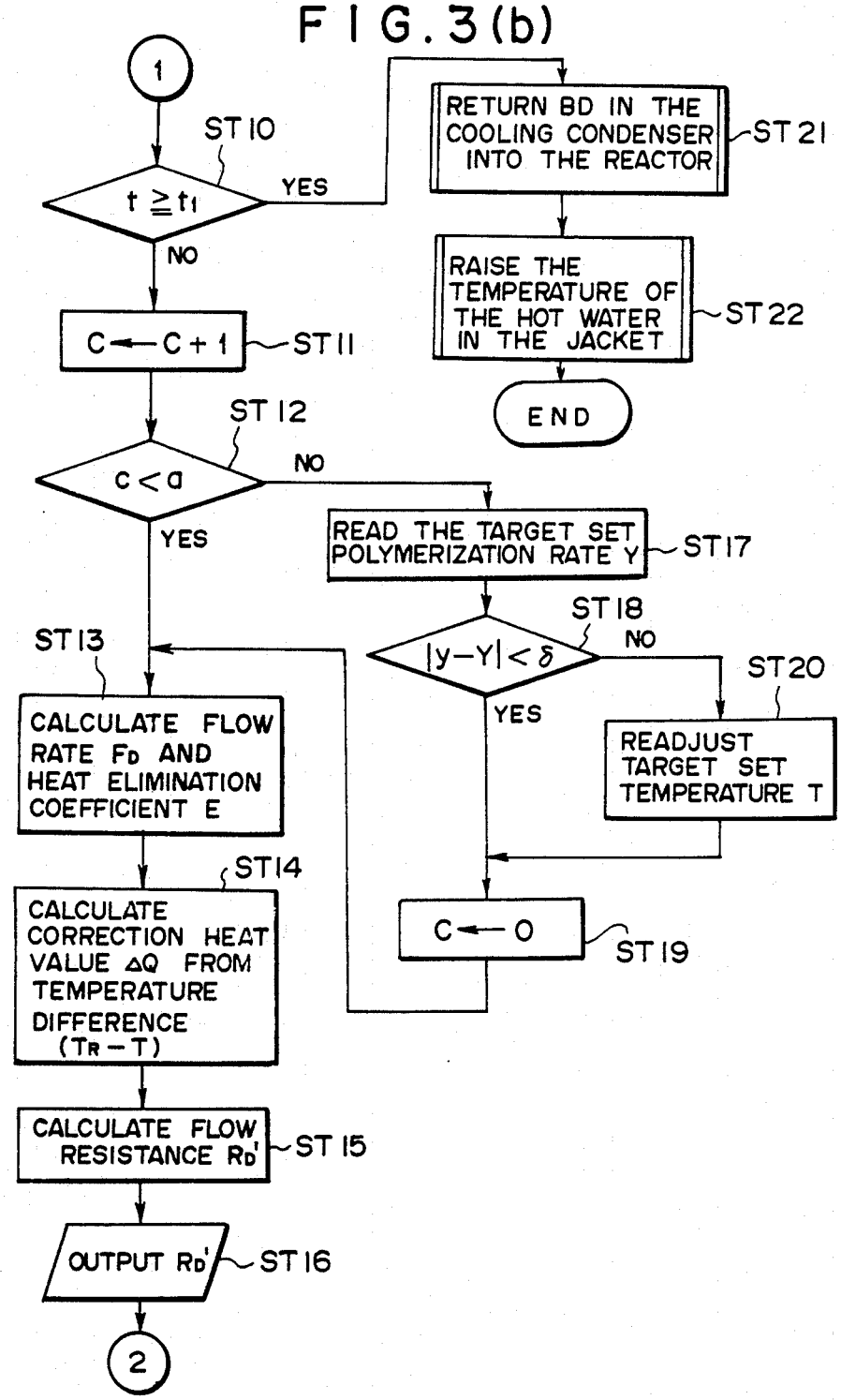

To a reactor with the inner wall of glass lining provided with incidental facilities as set forth in FIG. 1 and having the apparatus for controlling as set forth in FIGS. 2 and 3 were 190 parts by weight of deionized water, 2 parts by weight of potassium oleate, 1 part by weight of dextrose, 25 parts by weight of styrene, one part by weight of divinylbenzene and 0.2 parts by weight of diisopropylbenzene peroxide added. The reactor was purged with nitrogen gas while stirring the contents and placed under reduced pressure. Thereafter, 75 parts by weight of 1,3-butadiene (hereinafter referred to as BD) containing 30 ppm of a polymerization inhibitor were added. Then, the computer controlling according to the present invention was commenced.

First, warmed water of about 85° C. was circulated to the jacket of the reactor and when the contents of the reactor were elevated to temperature of 43° C., a mixture of 10 parts by weight of deionized water, 0.5 parts by weight of sodium pyrophosphate and 0.01 part by weight of ferrous sulfate was charged to the reactor to commence polymerization (at ST2 of FIG. 3(a) and I of FIG. 4). Thereafter, polymerization was followed in accordance with the flow chart of FIG. 3(a). Detection data was input at ST3 and ST4, and the heat release value $Q_p$ of the polymerization, the conversion x and the polymerization rate y were calculated every 5 seconds. The pressure at beginning of cooling at ST6 was set to 4.9 kg/cm² G and the period (a) for changing of the target value of polymerization temperature at ST12 was set to five minutes. The polymerization rate during 1.5 hours after the beginning of cooling was exactly controlled in such a manner that the target polymerization rate Y is 30%/h and the allowable difference δ between the target value and the calculated value is 5%/h and thereafter 100%/h.

In practical control, the polymerization rate immediately before the beginning of cooling was 35%/h which was larger than the target value and therefore, the target temperature immediately after the beginning of cooling was lowered to 58° C. from 60° C. Thereafter, since the polymerization rate was maintained within the allowable error, the target temperature was not changed. The polymerization was completed for 8 hours. Conversion was 98.5%. Average particle size of rubber was 0.075 μm.

EXAMPLE 2

The same polymerization as in Example 1 was effected using BD containing 70 ppm of a polymerization inhibitor. In this example, since the polymerization rate just prior to the beginning of cooling was 23%/h, the polymerization temperature was targeted for 63° C. and the target temperature was, thereafter, changed once. The polymerization was completed for 8 hours. Conversion was 98%. Average particle size of rubber was 0.077 μm.

COMPARATIVE EXAMPLE 1

The same polymerization as in Example 1 was effected by hand operation at temperatures of about 59° C. Average particle size of rubber was 0.088 μm which was somewhat larger than those obtained in Examples 1 and 2.

COMPARATIVE EXAMPLE 2

The same polymerization as in Example 1 was effected by hand operation and the polymerization temperature was 67° C. during one hour of from 0.5 hours after the beginning of cooling to 1.5 hours. Thereafter, the polymerization temperature was returned to 63° C. and the polymerization was continued. However, the conversion barely reached 94% after the lapse of 8 hours. Therefore, 0.5 parts by weight of dextrose and 0.05 parts by weight of diisoproplybenzene hydroperoxide were added to the reactor and further polymerization was effected for two hour to complete the reaction. Conversion was 97.8%.

While the invention has been particularly shown and described with reference to a preferred embodiment thereof, it will be understood by those skilled in the art that the foregoing and other changes in form and details can be made therein without departing from the spirit and scope of the invention.

What is claimed is:

1. An apparatus for controlling a polymerization reaction comprising:
   temperature-detecting means for detecting the temperature in a reactor;
   measuring means for measuring a heat release value of polymerization in the reactor;
   memory means for storing data representing a target polymerization rate and a degradation rate of a polymerization initiator, said degradation rate being a function of temperature;
   computing means for calculating a correction value from predetermined quantities, said quantities including said detected temperature, said heat release value of polymerization, said target polymerization rate and said degradation rate of said polymerization intiator, said quantities being inputted to said computing means during a period equal to or larger than a short time interval, and wherein said short time interval corresponds to a period within which a degree of polymerization increases by 0.1% at said target polymerization rate; and
   adjusting means for adjusting the temperature inside said reactor over said short time interval on the basis of said correction value such that a polymerization rate is brought closer to said target polymerization rate, wherein said adjusting means comprises a reflux condenser heat-eliminating means for controlling a flow rate of monomer or a refrigerant by means of control valves in accordance with said correction value.

2. An apparatus according to claim 1 wherein said adjusting means comprises a reactor jacket and wherein temperature is adjusted by controlling the flow rate of steam or water in said jacket by operating control valves in response to said correction value.

3. A method for controlling a polymerization reaction in a reactor comprising the steps of:
   measuring a heat release value of polymerization which is measured over a short time interval wherein said time interval corresponds to an interval within which a degree of polymerization increases by 0.1% at a target rate of polymerization;
   calculating a polymerization rate from said heat release value of polymerization;
   calculating a difference in polymerization rate between a target polymerization rate previously set and said polymerization rate calculated from said heat release value of polymerization;
   calculating a target set temperature on the basis of said difference in polymerization rates and a degradation rate of a polymerization initiator, said degradation rate being a function of temperature;
   calculating a temperature difference between said target set temperature and a detected temperature which is detected in said reactor over said short time interval; and
   adjusting the temperature inside the reactor over said short time interval on the basis of said temperature difference, so as to reduce said difference in polymerization rate.

* * * * *